United States Patent

Humes et al.

[11] Patent Number: 6,127,655
[45] Date of Patent: Oct. 3, 2000

[54] HEATING ARRANGEMENT FOR BABY STROLLER

[76] Inventors: Linda A. Humes; William J. Humes, both of 277 Barnert Ave., Totowa, N.J. 07512

[21] Appl. No.: 09/300,086

[22] Filed: Apr. 26, 1999

Related U.S. Application Data

[63] Continuation-in-part of application No. 08/978,086, Nov. 25, 1997, Pat. No. 5,897,162.
[51] Int. Cl.$^7$ ...................................................... H05B 1/00
[52] U.S. Cl. ................ 219/217; 297/180.12; 297/250.1; 280/47.38; 280/47.31
[58] Field of Search ...................................... 219/217, 528, 219/202, 212, 488, 200, 201, 533; 297/180.12; 280/642–650, 47.38, 47.31

[56] References Cited

U.S. PATENT DOCUMENTS

5,897,162   4/1999   Humes et al. ..................... 297/180.12

Primary Examiner—Teresa Walberg
Assistant Examiner—Vinod D Patel
Attorney, Agent, or Firm—Lawrence & Fridman

[57] ABSTRACT

A heated baby stroller comprises a seat body including a seat portion and a backrest portion. A child receiving recessed area is formed by the seat and backrest portions. An insulating padding is disposed within said child receiving recessed area. An electrical heating element is substantially positioned between the insulating padding and a protective cover substantially extending about the seat and backrest portions. The electrical heating element is surrounded by an insulating layer and a heating block is formed in such a manner that the padding and the insulating layer with the heating element are enveloped by a sheath.

16 Claims, 7 Drawing Sheets

HEATING ARRANGEMENT FOR BABY STROLLER

This application is a Continuation-In-Part Application of Ser. No. 08/978,086 filed Nov. 25, 1997 which is U.S. Pat. No. 5,897,162.

FILED OF THE INVENTION

The present invention relates baby strollers, and more particularly to heated baby strollers.

BACKGROUND OF THE INVENTION

In motor vehicles, safety seats have been used to maintain the seated posture of small children during travel and protect them from injuries at times of collision and from shocks at times of acceleration and deceleration. Current safety regulations make it mandatory that infants and small children are restrained while in an operating motor vehicle. In many states, such regulations mandate the use of child safety seats for children up to the age of four years. Modern child safety seats are typically removable structures which are positioned on permanent automotive seats during operation of a vehicle.

There have been known various seats forming a permanent part of a vehicle having a built-in heating device adapted to warm bodies of occupants. Such heated seats are known to be particularly common in European-built cars in which both the driver and passenger seats are provided with electrical heating elements. Several different types of heating elements and methods of attachment thereof to stationary car seats are known in the automobile industry.

Known heated seats are substantially stationary with respect to a body of automobile and form its inseparable pare. However, there is a known need for removable heated child safety seats capable of providing rapid heating of seating area and capable of providing rapid heating of seating area and having heating arrangements independent from that of the stationary car seats. The demand for such heated child safety seats is quite acute especially during cold seasons and/or in geographical locations having severe climate conditions. There is a specific need for autonomous heated child safety seats having heating elements distributed along its entire seating area, so that a child placed in such seat can be expeditiously heated. It is not uncommon for a child to be restrained within the child safety seat inside the car when engine and automobile heating systems are not operational. Furthermore, a child can be carried outside of the vehicle within such safety seat.

Foldable infant strollers have been in popular use for many years. However, none of the available foldable strollers have been manufactured with heating arrangements. Nevertheless, there is a known need for heated baby or infant strollers capable of providing rapid heating of seating area and formed with independent heating arrangements. The demand for such heated strollers is quite acute especially during cold seasons and/or in geographical locations having severe climate conditions. There is also a specific need for heated strollers having heating elements distributed along its entire seating area, so that a child placed in such stroller can be expeditiously heated. Thus, it is important to provide baby or infant stroller with an independent heating system capable of expeditiously warming a child's body.

SUMMARY OF THE INVENTION

One aspect of the invention provides a heated baby stroller having a seat body, a protective cover and an electrical heating element. The seat body includes a seat portion and a backrest portion. A child receiving recessed area is formed by the seat and backrest portion and an insulating padding is disposed within the child receiving recessed area. The electrical heating element is disposed substantially between the insulating padding and the protective cover so as to substantially extend about the seat and backrest portion. The electrical heating element is surrounded by an insulating layer and a heating block is formed in such a manner that the padding and the insulating layer with the heating element are enveloped by a sheath. Thus, in operation, a substantial portion of the child receiving recessed area is heated by the electrical heating element. A power arrangement can be provided for directing current to energizing the electrical heating element. The power arrangement can include a battery pack.

Another embodiment of the invention provides a power arrangement including a recharging circuit for recharging the battery pack. The recharging circuit is adapted for connection to the battery pack for recharging the same. As to a further embodiment of the invention, a thermal switch operably connected to the power arrangement is provided for effectively switching a power source off in response to the temperature within the child receiving recessed area reaching a predetermined level and switching said power source on in response to the temperature within the child receiving recessed area falling below a predetermined level.

As to still another embodiment of the invention, the padding is fixedly attached to an interior of the child receiving recessed area and a peripheral portion of the electrical heating element is affixed to the insulating padding in such a manner that the electrically heating element is integrally bonded to the padding.

The protective cover can be formed as a cushion member having an air permeable property, so that heat generated by the electrical heating element is transmitted to a child sitting in the stroller. The electrical heating element can be formed as a single heating wire arranged in a serpentine manner or formed as a plurality of electrical heating wires arranged in a serpentine manner.

According to still another embodiment of the invention, a connection cable electrically connects the electrical heating element for delivery electric current from the power source to the electrical heating element. A compartment can be formed positioned remotely from the child receiving recessed area and adapted for receiving a battery pack. A charged socket electrically connected to the power source can be provided for recharging from an outside source of electrical energy.

BRIEF DESCRIPTION OF THE DRAWINGS

Other advantages and features of the invention are described with reference to exemplary embodiments, which are intended to explain and not to limit the invention, and are illustrated in the drawings in which.

DETAILED DESCRIPTION OF THE PREFERRED EMBODIMENT

Figure 1:
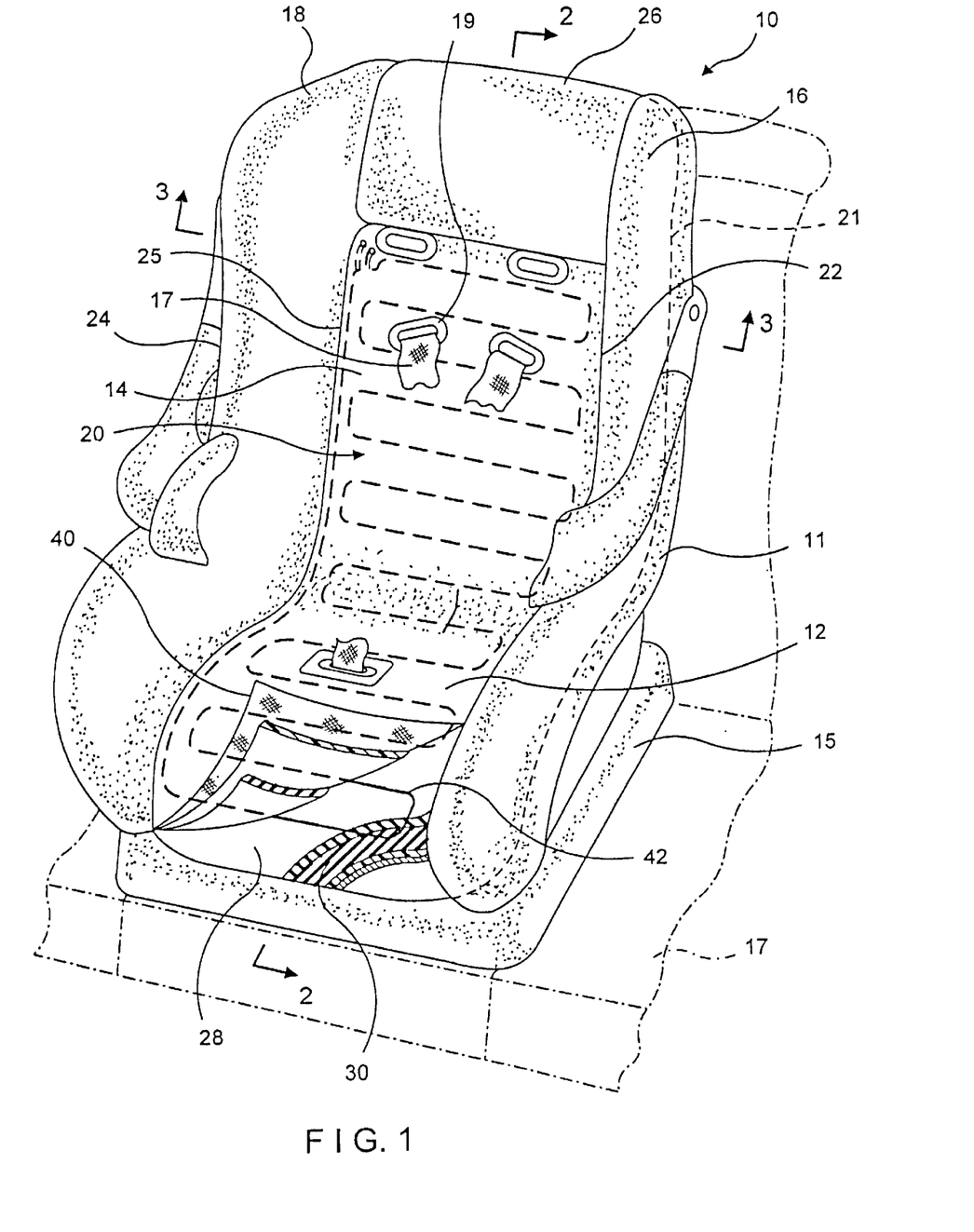
FIG. 1 is a perspective view showing a heated child safety seat of the invention.

Referring now to the drawings and particularly to FIG. 1, a heated child safety seat according to the invention is generally donated by number 10. The seat consists of a body 11 which includes a base 15, a seat portion 12 for seating a child, a backrest 14 attached to the seat portion for supporting the back of the child and first and second spaced apart side portions 16 and 18 transverse to the seat and backrest portions.

As shown in FIG. 1, the first side portion 16 extends between a first outer edge 22 and corresponding first inner edge 21. In a similar manner, the second side portion 18 extends between the second outer edge 24 and the second inner edge 25. The outer boundary of the seat portion 12 and the backrest 14 are delimited by the lower outer edge 28 and the upper outer edge 26. The interior of the seat, backrest and two side portions form a child receiving recessed area 20 adapted to receive a child during operation of the safety seat of the present invention. The child safety seat of the invention can be formed as a unitary body or an assembly containing the above-described elements.

A child seatbelt arrangement 17 is usually provided for restraining a child seated in the receiving recessed area 20. A plurality of slots 19 adapted for passage of the child seatbelts is formed within the body 11. In use, the child safety seat is attached to a stationary seat 17 of a motor vehicle (shown in FIG. 1 in phantom lines) by a conventional anchor arrangement.

As best illustrated in FIGS. 1–4, an insulating padding 30 having exterior 32 and interior 34 regions is associated with the child receiving recessed area 20. The padding 30 can include layers of foam rubber, foam plastic or other resilient material having suitable elasticity which provided good sating comfort and required electrical insulating properties. An insulating cover 40 is situated outside of the insulating padding.

Figure 2:
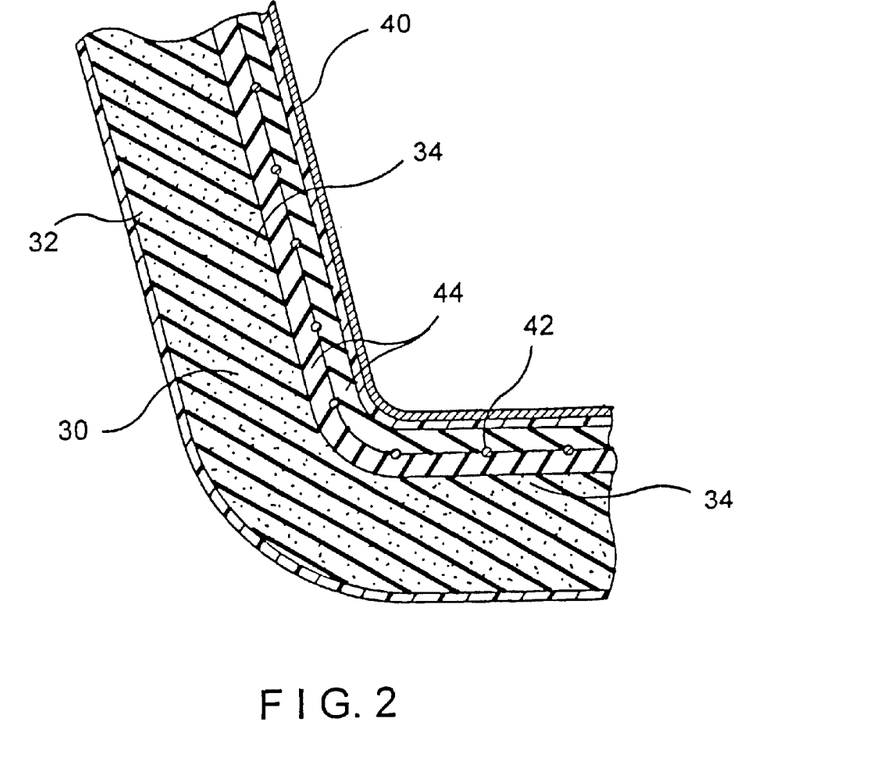
FIG. 2 is a partial cross-sectional view according to section line 2—2 of FIG. 1.
Figure 3:
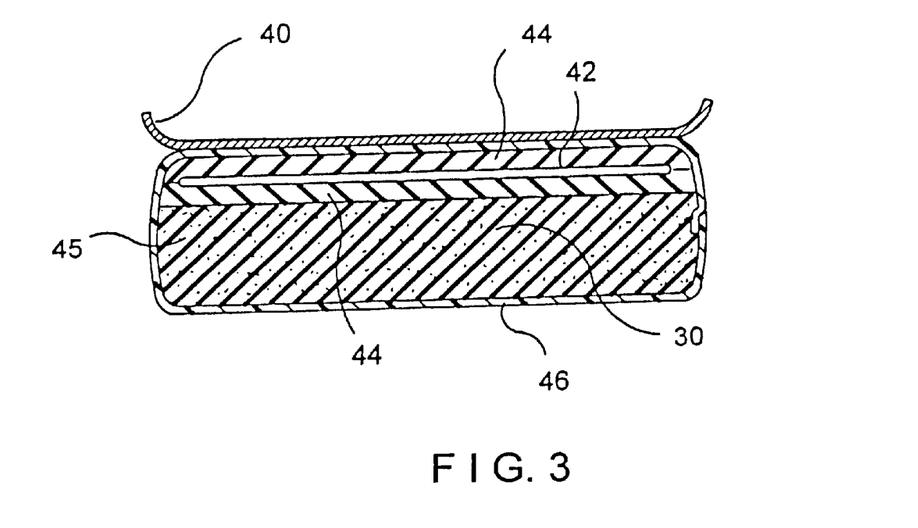
FIG. 3 is a partial cross-sectional view according to section line 3—3 of FIG. 1.
Figure 4:
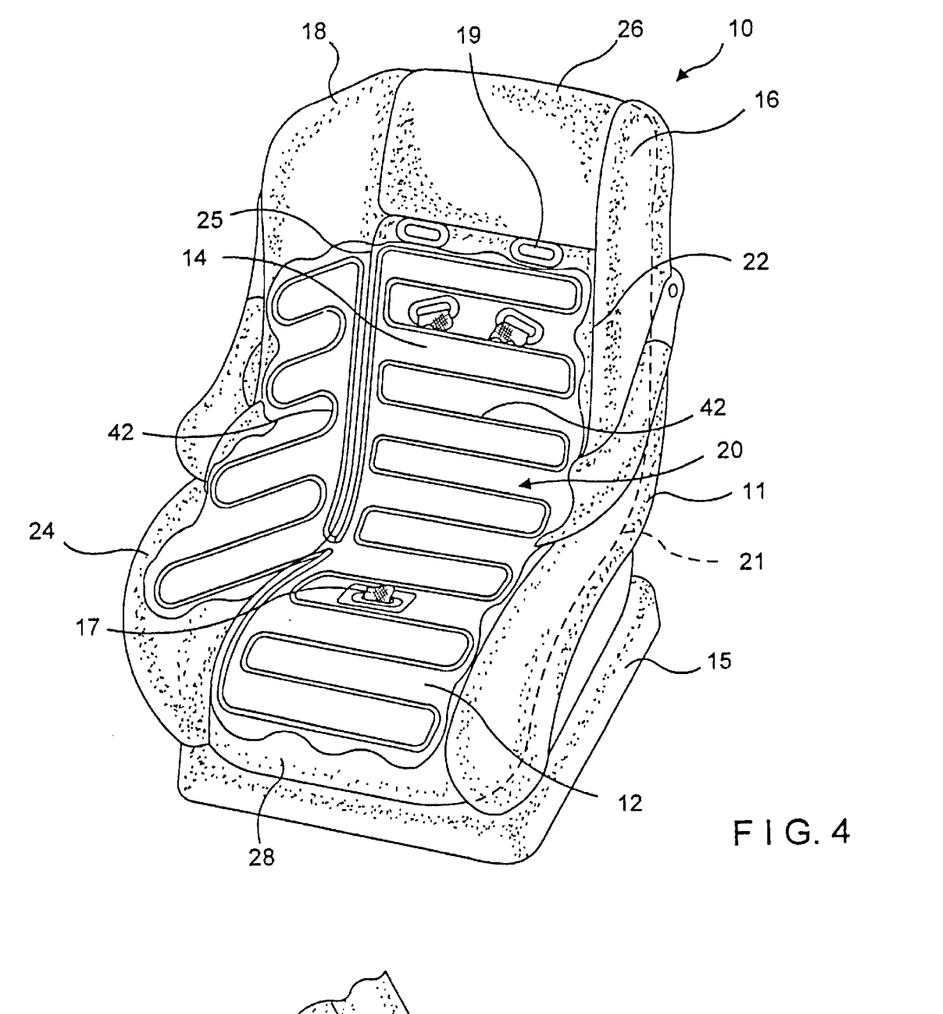
FIG. 4 is a perspective view of another embodiment of the heated child safety seat of the invention with partially removed insulating cover.
Figure 5:
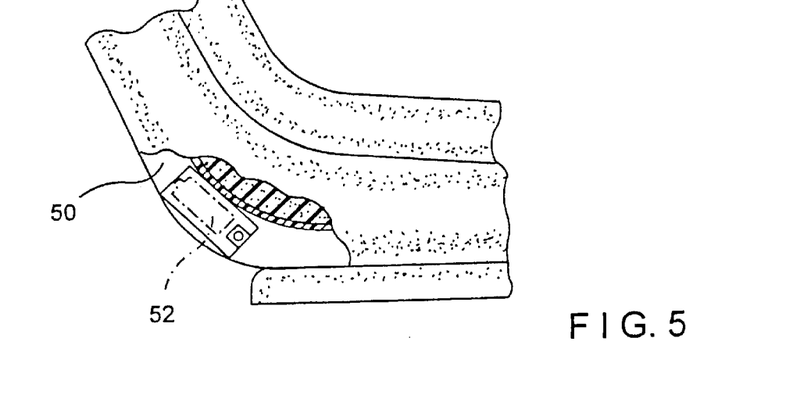
FIG. 5 is a partial breakaway view showing positioning of a battery pack.

An electrical heating element 42 provided for electrically heating the child safety seat is situated between the padding 30 and the cover 40. As best illustrated in FIGS. 1–3, electrical insulating layer 44 surrounds the electrical heating element 42. The heating element 42 is typically an elongated flexible resistance element which is made of a suitable metal alloy. Conventionally, the heating element is formed with a terminal end portion extending to a special junction block where it is connected to a battery pack 52. As shown in FIGS. 1 and 4, the electrical heating element 42 can be manufactured having either a single or multiple electrical heating wires. In the embodiment of the invention shown in FIG. 1, the electrical heating element 42 extends only at the seat 12 and backrest 14 portions.

However, the embodiment of the invention in which the electrical heating element 42 is provided to cover the entire child receiving recessed area 20 including the seat 12, backrest 14 and two side portions 16 and 18 (see FIG. 4), is also contemplated.

To enhance stability of the heating arrangement within the child safety seat, a heating block 45 (see FIG. 3 for example) is formed in the present invention. The block 45 encompasses the padding 30 and the insulating layer 44 with the heating element 42 enveloped by a sheath 46. When the insulating padding 30 is formed from soft and flexible material having good electrical insulating and other capabilities, the electrical heating element 42 through the insulated layer 44 can be embedded into the padding 30 in such a manner that the heating element is integrally bonded to the padding.

In the assembled condition of the heated child safety seat of the invention, the heating block 45 including the insulating padding 30 is positioned within the child receiving recessed area 20. Thus, as to the first side portion 16 (see FIG. 4), the padding and the electrical heating element 42 extend from the first outer edge 22 to the first inner edge 21. Similarly, in the second side element 18, the padding and the corresponding portion of the electrical heating element extend from the second outer edge 24 toward the second inner edge 25.

It is contemplated that any suitable type of batteries can be used to operate the present invention. Depending on the voltage desired and size/weight restrictions, any number of batteries can be selected providing required electrical supply. In one of the embodiments of the invention, for example, the battery pack 52 can contain four batteries. The charge socket can be electrically associated with the power source enabling the power source to be recharged from an outside electric source. A conventional 110 V charger can amply charge the battery pack 52 either in place inside the seat or upon its removal therefrom.

With this structure, and the heating device switched on, heat generated by the electrical heating element extending substantially through the child receiving recessed area is transmitted through the insulating cover 40 to a body of a child to be heated. It has been found that such arrangement can improve condition of a child considerably, so as to enable a child to be more comfortable within the car, especially in winter weather when either a car engine or a car heater is not functioning. Furthermore, the invention also substantially enhances the condition of a child who is carried out of the vehicle within the safety seat.

The present invention entails a battery-powered child safety seat which can be manufactured with a recharging arrangement that is designed to quickly and efficiently recharge the battery pack. To protect battery pack from excessive temperature during the charging process and operation, there can be provided a thermal switch that is operative to sense the temperature within the battery pack. In the event that the temperature of the pack exceeds a predetermined level.

The thermal switch is operative to open and, consequently, to terminate flow of charging current to the battery pack. In addition, the recharging arrangement of the invention has the advantage of having the capability for directly powering the child safety seat independently of the battery pack.

As a safety feature to prevent hypothermia of a child, there can be provided a thermal switch or a circuit that is operably associated with the child receiving recessed area for sensing the temperature therein. This thermal switch/circuit is designed such that in the event the temperature of the seat exceeds a certain level, the heating arrangement is operative to terminate the delivery of power thereto. Conversely, when the temperature in the child receiving recessed areas 20 falls below the predetermined temperature (for example, when the child is carried out of the vehicle within the safety seat) the heating arrangement is operative to initiate delivery of the power to the electrical heating element. In practice, the heating arrangement can include suitable temperature responsive control means, for example, a normally closed temperature responsive switch device such as a thermostat switch.

It should be obvious to a person skilled in the present art that the shape or form and location of the battery pack, as well as the arrangement or pattern of the heating element, can vary without adversely affecting or departing from the spirit of the invention.

Referring now to FIGS. 6–11, wherein a heated baby stroller 110 according to another embodiment of the invention is illustrated.

Figure 6:
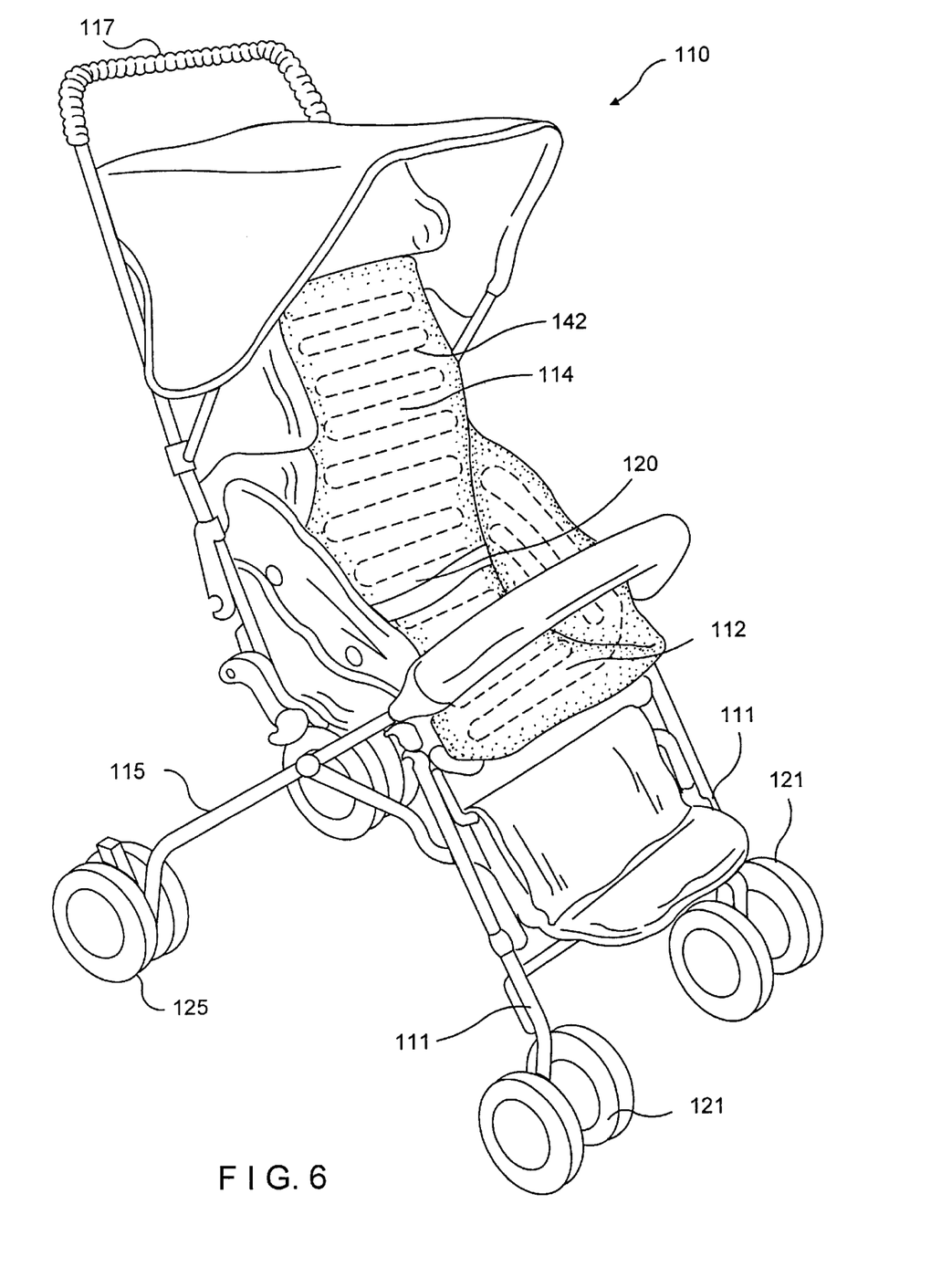
FIG. 6 is a front perspective view showing a heated baby stroller of the invention.
Figure 7:
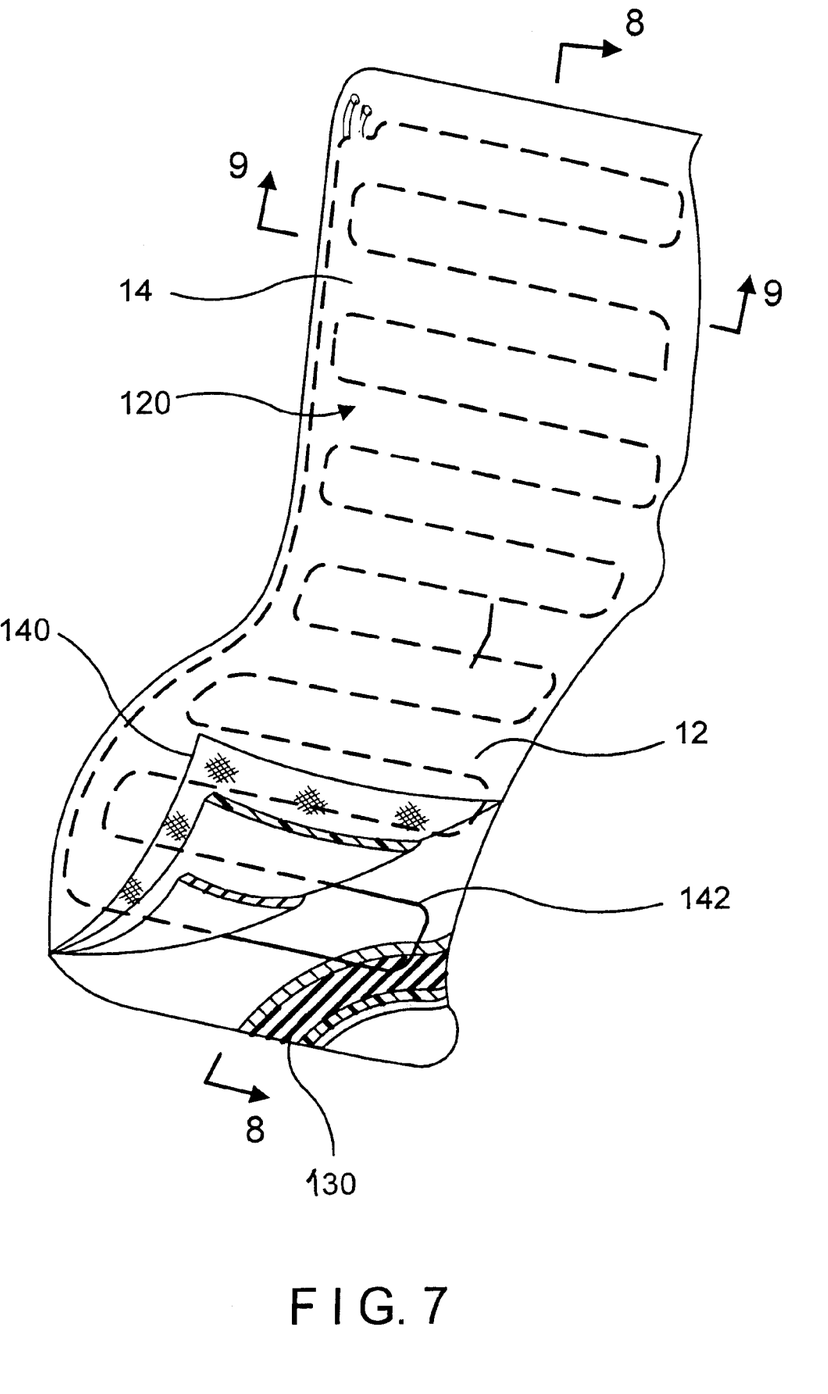
FIG. 7 is a partial detailed view of a child seating area.

A typical baby stroller consists of a seat body having a seat portion 112 and a backrest portion 114. A child receiving area 120 is formed by the seat and backrest portion. The backrest portion extends outwardly from a rear end of a seat portion so as to make changeble an angle of inclination of the backrest portion. The stroller also includes front legs 111 and rear legs 115 extending obliquely to each other. The legs are pivotably coupled to each other in a conventional manner. The backrest portion extends outwardly from the rear end of the seat portion.

A push handle 117 bent in a U-shape is also provided.

Front wheels 121 are attached to the lower ends of the front legs 111 can be provided with swivel mechanisms for swiveling the wheels independently of each other to steer the stroller. Locking devices can be provided in the swivel mechanisms so as to prevent the swivel mechanisms from allowing the front wheels to be swung to steer the baby carriage. The swivel mechanisms and locking devices are conventional in design. In a similar manner, the rear wheels 125 are attached to the lower ends of the rear legs 115 which can also be provided with swivel mechanisms.

Although, this embodiment of the invention has been described with reference to a specific baby stroller, use of the heating arrangement with any conventional baby stroller is contemplated.

The backrest portion 114 can be made of a flexible fabric such as cloth and provided with a core member along its central portion. Both sides of the backrest portion are connected to the substantially vertical members thus coupling the backrest portion to the stroller. When the backrest portion is raised up, both sides of the backrest are loosened. When the backrest is rearwardly inclined, the both sides of the backrest are relatively stretched or extended to a taut position.

An insulating padding 130 having exterior 132 and interior 134 regions is associated with the child receiving area 120 in a manner previously described with reference to FIGS. 1–4. In this respect, the padding 130 can include layers of foam rubber, foam plastic or other resilient material having suitable elasticity so as to provide good sitting comfort and required electrical insulating properties. An insulating cover 140 is situated outside the insulated padding.

An electrical heating element 142 provided for electrically heating the seat of the stroller is situated between the padding 130 and the cover 140. As best illustrated in FIGS. 6–11, an electrical insulating layer 144 surrounds the electrical heating element 142. The heating element 142 is typically an elongated flexible resistance element which is made of a suitable metal alloy. As shown in FIGS. 7–11, the electrical heating element 142 can be manufactured having either a single or multiple electrical heating wires. In the embodiment of the invention shown in FIG. 7, 8 and 10 the electrical heating element 142 extends only at the seat 112 and backrest 114 portions. However, extension of the heating element to other parts of the stroller is also contemplated.

To enhance stability of the heating arrangement within the stroller, a heating block 145 (see FIGS. 8 and 9, for example) is formed in the present invention. The block 145 encompasses the padding 130 and the insulating layer 144 with the heating element 142 enveloped by a sheath 146. When the insulating padding 130 is formed from soft and flexible material having good electrical insulating and other capabilities, the electrical heating element 142 through the insulated layer 144 can be embedded into the padding 130 in such a manner that the heating element is integrally bonded to the padding.

Figure 8:
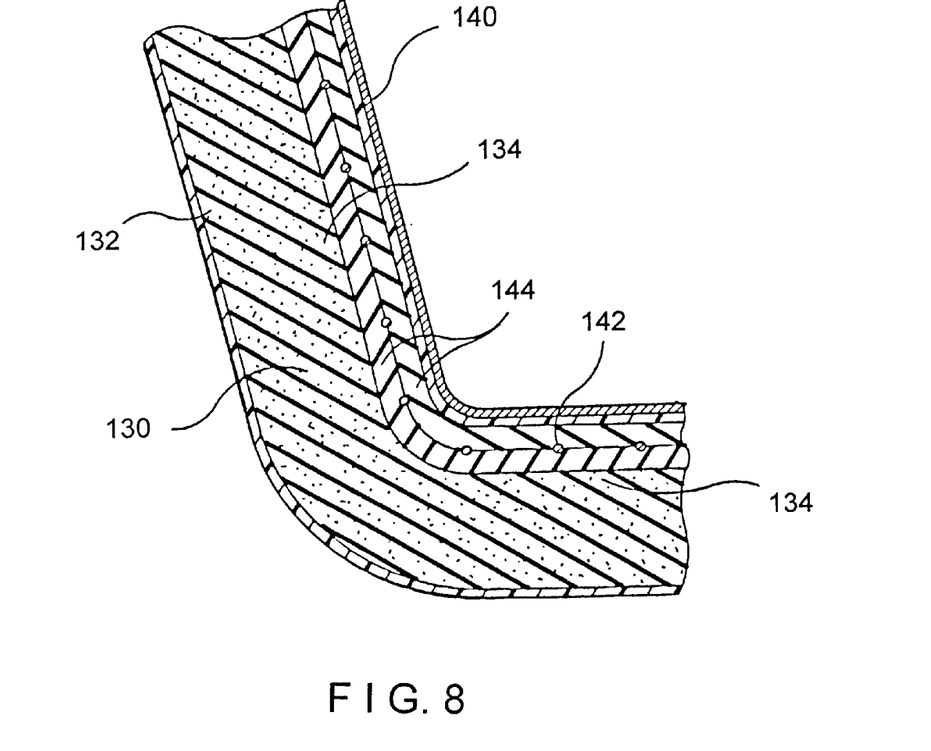
FIG. 8 is a partial cross-sectional view according to section line 8—8 of FIG. 7.
Figure 9:
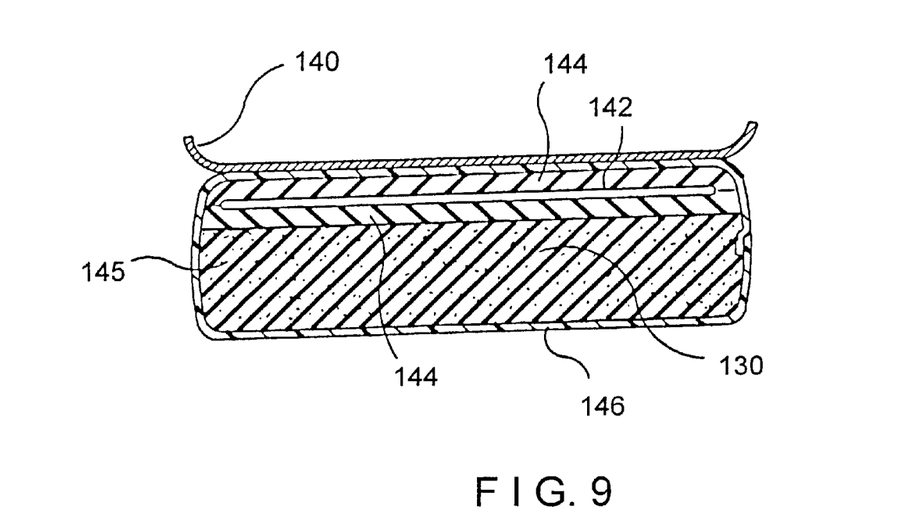
FIG. 9 is a partial cross-sectional view according to section line 9—9 of FIG. 7.
Figure 10:
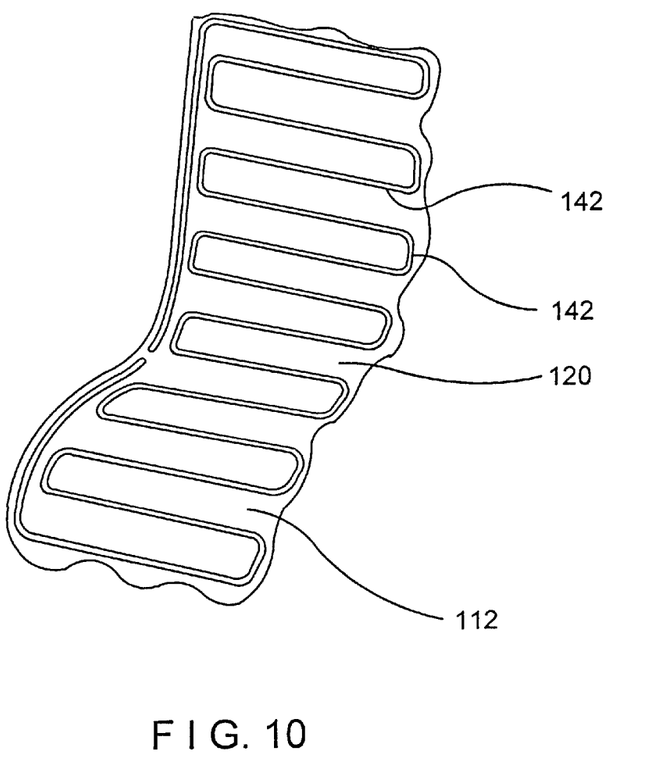
FIG. 10 is a partial perspective view of the heated baby stroller of the invention with partially removed insulating cover.
Figure 11:
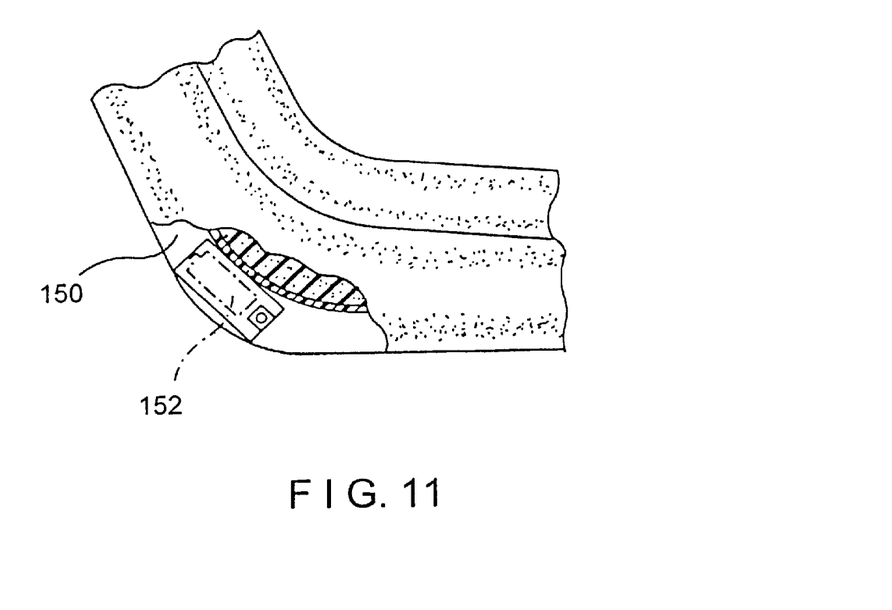
FIG. 11 is a partial breakaway view showing positioning of a battery pack.

In the assembled condition of the heated baby stroller of the invention, the heating block 145 including the insulating padding 130 is positioned within the child receiving area 120.

In a manner previously described, any suitable type of batteries can be used to operate the heated baby stroller. Depending on the voltage desired and size/weight restrictions, any number of batteries can be selected providing required electrical supply. In one of the embodiments of the invention, for example, the battery pack 152 can contain four batteries. The charge socket can be electrically associated with the power source enabling the power source to be recharged from an outside electric source. A conventional 110 V charger can amply charge the battery pack 152 either in place inside the seat or upon its removal therefrom.

With this structure, and the heating device switched on, heat generated by the electrical heating element extending substantially through the child receiving recessed area is transmitted through the insulating cover 40 to a body of a child to be heated.

The heated baby stroller can be manufactured with a recharging arrangement designed to quickly and efficiently recharge the battery pack.

The thermal switch is operative to open and, consequently, to terminate flow of charging current to the battery pack. In addition, the recharging arrangement of the invention has the advantage of having the capability for directly powering the child safety seat independently of the battery pack.

As a safety feature to prevent hypothermia of a child, the stroller can be formed with a thermal switch or a circuit that is operably associated with the child receiving area for sensing the temperature therein. When the temperature of the seat exceeds a certain level, the switch operates to terminate the delivery of power thereto. Conversely, when the temperature in the child receiving areas 120 falls below the predetermined temperature the heating arrangement initiates delivery of the power to the electrical heating element. In practice, the heating arrangement can include suitable temperature responsive control means, for example, a normally closed temperature responsive switch device such as a thermostat switch.

It should be obvious to a person skilled in the present art that the shape or form and location of the battery pack, as well as the arrangement or pattern of the heating element, can vary without adversely affecting or departing from the spirit of the invention.

With respect to the above description, it is to be realized that the optimum dimensional relationship for the parts of the invention, to include variations in size, materials, shape, form, function and the manner of operation, assembly and use, are deemed readily apparent and obvious to one skilled in the art. All equivalent relationship to those illustrated in the drawings and described in the specification are intended to be encompassed by the present invention. Therefore, the foregoing is considered as illustrative only of the principles of the invention, further, since numerous modifications and changes are obvious to those skilled in the art, is not desired to limit the invention to exact construction and operation shown and described, and accordingly, all suitable modifications and equivalents may be resorted to, falling within the scope of the invention.

What is claimed is:

1. A heated baby stroller comprising:

a stroller having a seat body, said seat body including a seat portion and a backrest portion, a child receiving recessed area formed by said seat and backrest portions; an insulating padding disposed within said child receiving recessed area formed by said seat and backrest portions;

a protective cover;

an electrical heating element substantially disposed between said insulating padding and said protective cover and substantially extending about said seat and backrest portions, said electrical heating element is surrounded by an insulating layer and a heating block is formed in such a manner that said padding and said insulating layer with the heating element are enveloped by a sheath so that in operation a substantial portion of said child receiving recessed area being heated by said electrical heating element.

2. The heated baby stroller of claim 1, further comprising a power arrangement for directing current to and energizing said electrical heating element, said power arrangement including a battery pack.

3. The heated baby stroller of claim 2, wherein said power arrangement further comprises a recharging circuit for recharging said battery pack, said recharging circuit being adapted for connection to said battery pack for recharging the same.

4. The heated baby stroller of claim 2, further including a thermal switch operably connected to said power arrangement for effectively switching a power source off in response to the temperature within said child receiving recessed area reaching a predetermined level and switching said power source on in response to the temperature within said child receiving recessed area falling below a predetermined level.

5. The heated baby stroller of claim 4, wherein said padding is fixedly attached to an interior of said child receiving recessed area and a peripheral portion of said electrical heating element is affixed to said insulating padding in such a manner that said electrical heating element is integrally bonded to said padding.

6. The heated baby stroller of claim 5, wherein said protective cover is a cushion member having an air permeable property so that heat generated by said electrical heating element is transmitted to a child sitting in said stroller.

7. The heated baby stroller of claim 2, wherein said electrical heating element is a single electrical heating wire arranged in a serpentine manner.

8. The heated baby stroller of claim 2, wherein said electrical heating element comprises a plurality of electrical heating wires arranged in a serpentine manner.

9. A heated baby stroller of claim 2, further comprising a connection cable electrically connected to said electrical heating element for delivery electric current from said power source to said electrical heating element.

10. The heated baby stroller of claim 6, wherein said stroller is formed with a compartment positioned remotely from said child receiving recessed area and adapted for receiving a battery pack therein, said stroller further including a charge socket electrically connected to the power source to be recharged from an outside source of electrical energy.

11. A heated baby stroller comprising:

a stroller having a seat body, said seat body including a seat portion and a backrest portion, a child receiving recessed area formed by said seat and backrest portions; an insulating padding disposed within said child receiving recessed area formed by said seat and backrest portions;

a protective cover;

an electrical heating element substantially disposed between said insulating padding and said protective cover and substantially extending about said seat and backrest portions, said electrical heating element is surrounded by an insulating layer, so that in operation at least a substantial portion of said child receiving recessed area being heated by said electrical heating element.

12. The heated baby stroller of claim 11, wherein a heating block is formed in such a manner that said padding and said insulating layer with the heating element are enveloped by a sheath.

13. The heated baby stroller of claim 12, wherein said padding is fixedly attached to an interior of said child receiving recessed area and a peripheral portion of said electrical heating element is affixed to said insulating padding in such a manner that said electrical heating element is integrally bonded to said padding.

14. The heated baby stroller of claim 13, wherein said protective cover is a cushion member having an air permeable property so that heat generated by said electrical heating element is transmitted to a child sitting in said stroller.

15. The heated baby stroller of claim 12, wherein said electrical heating element is a single electrical heating wire arranged in a serpentine manner.

16. The heated baby stroller of claim 12, wherein said electrical heating element comprises a plurality of electrical heating wires arranged in a serpentine manner.

* * * * *